(12) United States Patent
Watanabe et al.

(10) Patent No.: US 8,658,298 B2
(45) Date of Patent: Feb. 25, 2014

(54) LAMINATE OUTER PACKAGING STORAGE DEVICE

(75) Inventors: Yuu Watanabe, Hokuto (JP); Naoshi Yasuda, Komatsu (JP); Nobuo Ando, Nakakoma-gun (JP); Makoto Taguchi, Kai (JP)

(73) Assignee: JM Energy Corporation, Hokuto (JP)

( * ) Notice: Subject to any disclaimer, the term of this patent is extended or adjusted under 35 U.S.C. 154(b) by 0 days.

(21) Appl. No.: 13/582,064

(22) PCT Filed: Apr. 30, 2010

(86) PCT No.: PCT/JP2010/057662
§ 371 (c)(1),
(2), (4) Date: Aug. 31, 2012

(87) PCT Pub. No.: WO2011/108126
PCT Pub. Date: Sep. 9, 2011

(65) Prior Publication Data
US 2012/0328934 A1 Dec. 27, 2012

(30) Foreign Application Priority Data
Mar. 2, 2010 (JP) ................................ 2010-044852

(51) Int. Cl.
*H01M 2/12* (2006.01)
(52) U.S. Cl.
USPC ................ 429/56; 429/82; 429/185; 361/521
(58) Field of Classification Search
USPC ........ 429/53, 56, 82, 162, 163, 185; 361/518, 361/521
See application file for complete search history.

(56) References Cited

U.S. PATENT DOCUMENTS

| 7,267,906 | B2 | 9/2007 | Mizuta et al. |
| 7,579,111 | B2 | 8/2009 | Mizuta et al. |

(Continued)

FOREIGN PATENT DOCUMENTS

| CN | 1641903 A | 7/2005 |
| JP | 4 68368 | 6/1992 |

(Continued)

OTHER PUBLICATIONS

English translation of Japanese Patent Document No. 4-68368, Jun. 17, 1992.*

(Continued)

*Primary Examiner* — Carlos Barcena
*Assistant Examiner* — Lilia V Nedialkova
(74) *Attorney, Agent, or Firm* — Oblon, Spivak, McClelland, Maier & Neustadt, L.L.P.

(57) ABSTRACT

A laminate-packaged electric storage device includes an outer package, an electric storage device element, and an electrolyte solution, the outer package formed by stacking and seal-tight bonding outer package films along a bonding section formed in an outer edge area of the outer package films, the electric storage device element and the electrolyte solution being held in a receiving section formed inside the outer package. A non-bonding section surrounded by the bonding section and communicating with the receiving section is formed in the outer edge area, an opening is formed through at least one outer package film, and a seal section is formed to surround the opening formed in an area of the non-bonding section, the outer package films bonded in the seal section, and the opening formed in the area of the non-bonding section at a position other than a center position.

10 Claims, 8 Drawing Sheets

(56) References Cited

U.S. PATENT DOCUMENTS

| | | |
|---|---|---|
| 8,057,933 B2 | 11/2011 | Miyahisa et al. |
| 2003/0232236 A1 | 12/2003 | Mitchell et al. |
| 2006/0051658 A1* | 3/2006 | Otohata et al. ............ 429/53 |
| 2008/0008936 A1 | 1/2008 | Mizuta et al. |
| 2008/0233468 A1 | 9/2008 | Otohata et al. |
| 2008/0241680 A1* | 10/2008 | Lee et al. .................. 429/185 |
| 2009/0053585 A1 | 2/2009 | Nakazawa |

FOREIGN PATENT DOCUMENTS

| | | |
|---|---|---|
| JP | 5 13061 | 1/1993 |
| JP | 11 86823 | 3/1999 |
| JP | 3554155 | 8/2004 |
| JP | 2006 179547 | 7/2006 |
| JP | 2006 236605 | 9/2006 |
| JP | 2006 332009 | 12/2006 |
| JP | 3859645 | 12/2006 |
| JP | 2007 157678 | 6/2007 |
| JP | 2008 293992 | 12/2008 |
| WO | 2009/078604 | 6/2009 |

OTHER PUBLICATIONS

International Search Report Issued Jul. 20, 2010 in PCT/JP10/57662 Filed Apr. 30, 2012.
U.S. Appl. No. 13/520,695, filed Jul. 5, 2012, Mizukami et al.
Extended European Search Report issued Sep. 20, 2013, in European Patent Application No. 10847023.8.

* cited by examiner

PRIOR ART

LAMINATE OUTER PACKAGING STORAGE DEVICE

TECHNICAL FIELD

The present invention relates to a laminate-packaged electric storage device. More specifically, the invention relates to a laminate-packaged electric storage device in which an electric storage device element (e.g., battery or capacitor) is held inside an outer package that is formed by two outer package films.

BACKGROUND ART

In recent years, a laminate-packaged electric storage device (e.g., battery or capacitor) has been used as a power supply for a portable system, an electric vehicle, and the like. The laminate-packaged electric storage device has a configuration in which an electric storage device element (e.g., battery element) and an electrolyte solution are held inside an outer package that is formed by two outer package films, the electric storage device element being formed by winding or alternately stacking positive plates and negative plates via separators.

The laminate-packaged electric storage device has a problem in that an inflammable gas or the like is generated inside the outer package when the electrolyte solution is electrochemically decomposed or thermally decomposed due to overcharging or exposure to a high temperature, so that the pressure inside the outer package increases. A laminate-packaged electric storage device provided with a safety mechanism has been proposed in order to solve the above problem. The safety mechanism may have a configuration in which the bonding section of the two outer package films of the outer package includes a weakly bonded area, and the weakly bonded area functions as a safety valve for discharging gas when the internal gas pressure has increased, or may be provided with a safety valve that automatically opens when the internal pressure has increased to a value equal to or larger than a given value, and discharges an inflammable gas, for example (see Patent Documents 1 to 5, for example, Patent Document 1: Japanese Patent No. 3554155, Patent Document 2: JP-A-05-013061, Patent Document 3: JP-A-11-086823, Patent Document 4: JP-A-2006-236605, Patent Document 5: JP-A-2007-157678).

FIG. 15 is an exploded view illustrating the configuration of a laminate-packaged electric storage device that is provided with a safety mechanism in which the bonding area of the outer package includes a weakly bonded area. The outer package of a laminate-packaged electric storage device 50 illustrated in FIG. 15 is formed by stacking and heat-sealing the outer edge area of an upper outer package film 51A and the outer edge area of a lower outer package film 51B (i.e., forming a bonding section 52) so that a receiving section that holds an electric storage device element is formed inside the outer package. A thin electric storage device element 55 (e.g., battery element or capacitor element) is provided inside the receiving section of the outer package together with an organic electrolyte solution.

The laminate-packaged electric storage device 50 is configured so that the bonding section 52 includes a weakly bonded area 53. The weakly bonded area 53 functions as a safety valve, so that gas is discharged through the weakly bonded area 53 (i.e., pressure is released) when a large amount of gas is generated inside the outer package. This makes it possible to prevent a situation in which the outer package bursts. More specifically, the weakly bonded area 53 has a seal strength lower than that of the remaining area of the bonding section 52, and separation preferentially occurs in the weakly bonded area 53 to form a vent when the pressure inside the receiving section of the outer package that holds the electric storage device element (battery element or capacitor element) has reached a given value.

In the example illustrated in FIG. 15, the outer package has a rectangular shape, and a positive electrode power supply tab 56 (i.e., common positive electrode lead member) that is electrically connected to a plurality of positive plates included in the electric storage device element 55 (battery element or capacitor element), and a negative electrode power supply tab 57 (i.e., common negative electrode lead member) that is electrically connected to a plurality of negative plates included in the electric storage device element 55, are provided to outwardly extend from either short side of the outer package.

The laminate-packaged electric storage device having the above configuration is required to ensure that separation reliably occurs in the weakly bonded area that forms the safety mechanism to form a vent when the pressure inside the receiving section (space) has reached a given value, and the weakly bonded area has sufficient seal strength so that the outer package is reliably sealed (i.e., exhibits high reliability). However, it is difficult to form a weakly bonded area that has sufficient seal strength from the viewpoint of the production process.

Patent Document 6 (Japanese Patent No. 3859645) discloses a laminate-packaged electric storage device provided with a safety mechanism in which at least one non-bonding section (pressure concentration section) is formed in the area of the bonding section so that the non-bonding section protrudes into the receiving section that holds the electric storage device element, and a pressure release section that connects the inner space and the outer space upon separation of the outer package films is formed in the area of the non-bonding section.

According to the above safety mechanism, however, since stress is relatively uniformly applied over the entire outer edge area of the pressure release section when the internal pressure has increased, separation of the outer package films occurs at an unspecified position of the pressure release section, and leakage of the electrolyte solution from the receiving section may occur depending on the separation position. Moreover, since separation of the outer package films may occur in the pressure release section even if the pressure inside the outer package is low, it is difficult to ensure the seal-tightness of the outer package.

RELATED-ART DOCUMENT

Patent Document

Patent Document 1: Japanese Patent No. 3554155
Patent Document 2: JP-A-05-013061
Patent Document 3: JP-A-11-086823
Patent Document 4: JP-A-2006-236605
Patent Document 5: JP-A-2007-157678
Patent Document 6: Japanese Patent No. 3859645

SUMMARY OF THE INVENTION

Technical Problem

The invention was conceived in view of the above situation. An object of the invention is to provide a laminate-packaged electric storage device that can reliably discharge gas from a specific area without causing leakage of an electrolyte solution when gas is generated inside an outer package of the laminate-packaged electric storage device.

Solution to Problem

According to one aspect of the invention, there is provided a laminate-packaged electric storage device comprising:

an outer package, an electric storage device element, and an electrolyte solution, the outer package being formed by stacking and seal-tight bonding outer package films along a bonding section that is formed in an outer edge area of each of the outer package films, and the electric storage device element and the electrolyte solution being held in a receiving section that is formed inside the outer package, a non-bonding section that is surrounded by the bonding section and communicates with the receiving section being formed in the outer edge area of each of the outer package films, an opening that is formed through at least one of the outer package films, and a seal section that is formed to surround the opening being formed in an area of the non-bonding section, the outer package films being bonded in the seal section, and the opening being formed in the area of the non-bonding section at a position other than a center position.

In the laminate-packaged electric storage device, the non-bonding section may have an approximately rectangular planar shape, and have one side that communicates with the receiving section, and the seal section may be integrally formed with the bonding section so that part of the seal section protrudes into the non-bonding section from the bonding section on another side of the non-bonding section that is perpendicular to the one side that communicates with the receiving section.

In the laminate-packaged electric storage device, it is preferable that the non-bonding section include a functional section that is surrounded by the bonding section, and has the opening formed therein, and a link section that links the functional section and the receiving section. It is more preferable that the link section of the non-bonding section be bent.

In the laminate-packaged electric storage device, the seal section may be integrally formed with the bonding section so that part of the seal section protrudes into the non-bonding section from the bonding section.

In the laminate-packaged electric storage device, it is preferable that the opening have an n-gonal shape (n≥3), and a bonding width between an edge of a circle circumscribed to the n-gonal shape and an edge of the seal section be 0.2 to 2.0 mm.

In the laminate-packaged electric storage device, it is preferable that a non-thermally-bondable sheet that is formed of a polyimide, polyphenylene sulfide, or cellulose be provided between the non-bonding sections of the outer package films. It is more preferable that the non-thermally-bondable sheet be secured on at least one of the outer package films via a pressure-sensitive adhesive layer. More specifically, one non-thermally-bondable sheet may be secured on one of the outer package films, or two non-thermally-bondable sheets may respectively be secured on either of the outer package films.

Advantageous Effects of the Invention

According to the laminate-packaged electric storage device, when gas has been generated inside the receiving section of the outer package that holds the electric storage device element, the gas enters the non-bonding section formed in the outer edge area of the outer package, and the receiving section and the non-bonding section are sufficiently expanded corresponding to the amount of the gas. Therefore, stress is applied to the seal section. Since the opening is formed in the area of the non-bonding section at a position other than the center position, stress is concentrated on a specific area of the seal section that surrounds the opening, and the specific area of the seal section is preferentially removed as compared with the remaining area of the seal section and the bonding section. The gas generated inside the outer package is discharged to the outside through the opening when the seal section has been removed.

Therefore, when gas has been generated inside the outer package, and the outer package has been expanded due to the gas, a large stress is applied to the specific area of the seal section, and the specific area of the seal section is necessarily removed. This makes it possible to reliably discharge the gas to the outside through the opening without causing leakage of the electrolyte solution. Moreover, since the seal section is rarely removed when the pressure inside the outer package is low, it is possible to ensure that the outer package has high seal-tightness.

When the non-bonding section includes the functional section in which the safety valve is formed, and the link section that links the functional section and the receiving section, it is possible to prevent a situation in which the pressure inside the receiving section decreases rapidly when the seal section of the safety valve is removed. This makes it possible to reliably prevent leakage of the electrolyte solution.

When the link section of the non-bonding section is bent, the receiving section and the safety valve are connected via a sufficiently long path. This makes it possible to more reliably prevent leakage of the electrolyte solution. When the opening has an n-gonal shape (n≥3), and the bonding width between the edge of a circle circumscribed to the n-gonal shape and the edge of the seal section is 0.2 to 2.0 mm, stress is concentrated on the specific area of the seal section when the outer package is expanded. Therefore, the seal section is reliably removed when the pressure inside the outer package has reached a given pressure, even if the outer package is expanded rapidly. It is thus possible to obtain a high response to rapid expansion of the outer package.

When the non-thermally-bondable sheet is provided between the non-bonding sections of the outer package films, it is possible to prevent a situation in which the non-bonding sections of the outer package films are bonded, or part of the outer package films is dissolved in the electrolyte solution and bonded in a heating or high-temperature environment. This makes it possible to ensure that the laminate-packaged electric storage device exhibits operation reliability.

When the non-thermally-bondable sheet is secured on one of the outer package films via the pressure-sensitive adhesive layer, it is possible to easily position the non-bonding section and the opening, so that the shape/dimensional accuracy of the non-bonding section and the opening is improved. This makes it possible to reduce a variation in internal pressure at which gas is discharged.

DESCRIPTION OF EMBODIMENTS

Exemplary embodiments of the invention are described in detail below.

Figure 1:
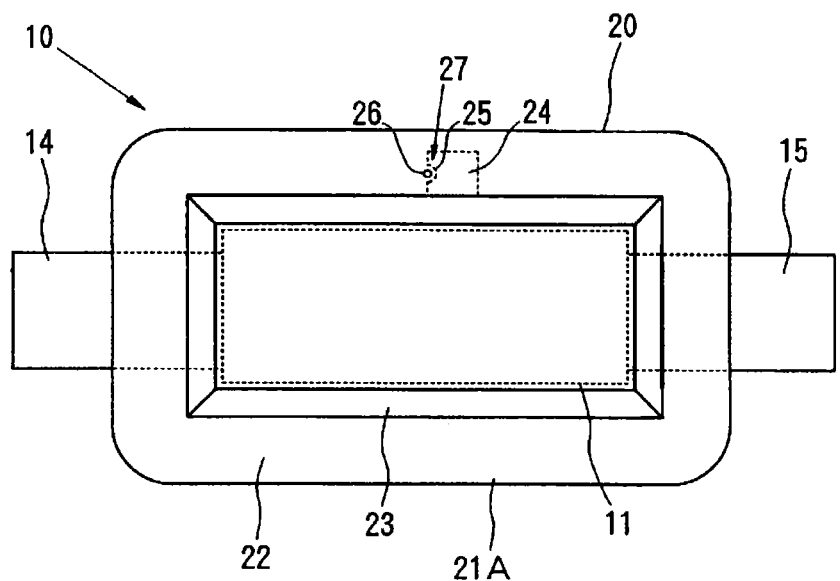
FIG. 1 is a plan view illustrating the configuration of a laminate-packaged electric storage device according to one embodiment of the invention.
Figure 2:
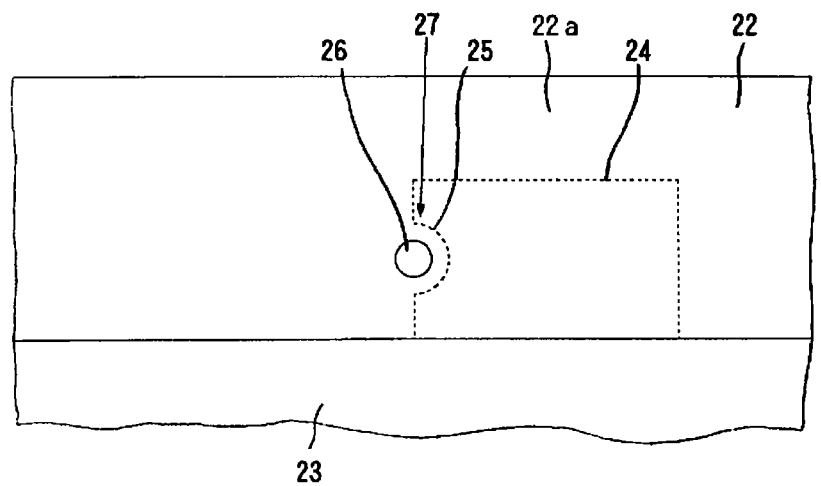
FIG. 2 is a view illustrating a safety mechanism of the laminate-packaged electric storage device illustrated in FIG. 1.
Figure 3:
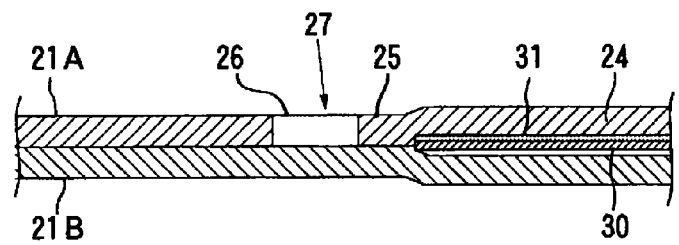
FIG. 3 is a cross-sectional view illustrating the safety mechanism illustrated in FIG. 2.

FIG. 1 is a plan view illustrating the configuration of a laminate-packaged electric storage device according to one embodiment of the invention, FIG. 2 is a view illustrating a safety mechanism of the laminate-packaged electric storage device illustrated in FIG. 1, and FIG. 3 is a cross-sectional view illustrating the safety mechanism illustrated in FIG. 2.

A laminate-packaged electric storage device 10 illustrated in FIG. 1 includes an outer package 20 that is formed by seal-tight bonding an upper outer package film 21A and a lower outer package film 21B that have a rectangular shape and exhibit thermal adhesiveness along a bonding section 22 that is formed over the outer edge area of the upper outer package film 21A and the lower outer package film 21B in a state in which the upper outer package film 21A is superposed on the lower outer package film 21B. A receiving section 23 that holds an electric storage device element is formed inside the outer package 20. The electric storage device element is held in the receiving section 23 together with an organic electrolyte solution.

In the example illustrated in the drawings, the upper outer package film 21A has been drawn in an area in which the receiving section 23 is formed.

A non-bonding section 24 that has an approximately rectangular planar shape is formed in the outer edge area of the upper outer package film 21A and the lower outer package film 21B of the outer package 20, one side of the non-bonding section 24 communicating with the receiving section 23, and the remaining sides of the non-bonding section 24 being surrounded by the bonding section 22. A safety valve 27 is formed in the area of the non-bonding section 24 at a position other than the center position, the safety valve 27 including an opening 26 that is formed through the upper outer package film 21A, and a seal section 25 that is formed to surround the opening 26, the upper outer package film 21A and the lower outer package film 21B being bonded in the seal section 25. In the example illustrated in the drawings, the seal section 25 of the safety valve 27 is integrally formed with the bonding section 22 so that part of the seal section 25 semicircular protrudes into the non-bonding section 24 from the bonding section 22 on the side of the non-bonding section 24 that is perpendicular to the side that communicates with the receiving section 23.

A non-thermally-bondable sheet 30 that has a planar shape similar to that of the non-bonding section 24 is provided between the non-bonding section 24 of the upper outer package film 21A and the non-bonding section 24 of the lower outer package film 21B. The non-thermally-bondable sheet 30 is secured on the upper outer package film 21A via a pressure-sensitive adhesive layer 31, for example.

A film prepared by sequentially stacking a polypropylene (hereinafter referred to as "PP") layer, an aluminum layer, and a nylon layer may preferably be used as the upper outer package film 21A and the lower outer package film 21B that form the outer package 20, for example.

When using a film prepared by sequentially stacking a PP layer, an aluminum layer, and a nylon layer as the upper outer package film 21A and the lower outer package film 21B, the thickness of the film is normally 50 to 300 micrometers.

The longitudinal dimension and the lateral dimension of the upper outer package film 21A and the lower outer package film 21B are appropriately selected depending on the dimensions of the electric storage device element 11 held in the receiving section 23. For example, the longitudinal dimension of the upper outer package film 21A and the lower outer package film 21B is 40 to 200 mm, and the lateral dimension of the upper outer package film 21A and the lower outer package film 21B is 60 to 300 mm.

The bonding width of the bonding section 22 of the upper outer package film 21A and the lower outer package film 21B is preferably 2 to 50 mm, more preferably 2 to 40 mm, and still more preferably 2 to 15 mm, for example. Note that the bonding width of a narrow area 22a formed on one side of the bonding section 22 that is adjacent to the non-bonding section 24 may be either identical with or different from the bonding width of the remaining three sides.

The dimensions of the non-bonding section 24 are determined depending on the dimensions of the bonding section 22 and the receiving section 23. For example, the dimension of one side of the non-bonding section 24 that communicates with the receiving section 23 is 5 to 40 mm, and the dimension of each side of the non-bonding section 24 that is perpendicular to the one side (i.e., each side that extends in the vertical direction in FIG. 1) is 3 to 12 mm.

The opening 26 of the safety valve 27 may have a circular shape. It is preferable that the opening 26 have an n-gonal (n is equal to or larger than 3) shape (e.g., pentagonal or hexagonal shape) (more preferably a regular n-gonal shape). Note that the internal pressure at which gas is discharged may vary when n is small. Therefore, it is preferable that n be equal to or larger than 5. However, when n is large, the opening 26 has a shape similar to a circle (i.e., the effect of the n-gonal shape is reduced). Therefore, it is preferable that n be equal to or smaller than 8.

The diameter of the opening 26 of the safety valve 27 is preferably 0.5 to 8 mm, and more preferably 1.0 to 6 mm.

Note that the diameter of the opening 26 refers to the diameter of a circle when the opening 26 has a circular shape, and refers to the diameter of a circle circumscribed to an n-gonal shape when the opening 26 has an n-gonal shape.

The bonding width of the seal section 25 of the safety valve 27 is preferably 0.2 to 2 mm, and more preferably 0.3 to 1.2 mm. If the bonding width of the seal section 25 is too small, the internal pressure at which gas is discharged may vary, or it may be difficult to ensure a sealed state (i.e., reliability may deteriorate). If the bonding width of the seal section 25 is too large, the bonding section 22 may be removed before the seal section 25 is removed.

Note that the bonding width of the seal section 25 refers to the distance from the edge of the opening 26 to the edge of the seal section 25 when the opening 26 has a circular shape, and refers to the distance from the edge of a circle circumscribed to an n-gonal shape to the edge of the seal section 25 when the opening 26 has an n-gonal shape.

The non-thermally-bondable sheet 30 is preferably formed using a polyimide, polyphenylene sulfide, or cellulose.

The thickness of the non-thermally-bondable sheet 30 is 0.01 to 0.05 mm, for example.

The pressure-sensitive adhesive layer 31 may be formed using an arbitrary pressure-sensitive adhesive.

Figure 4:
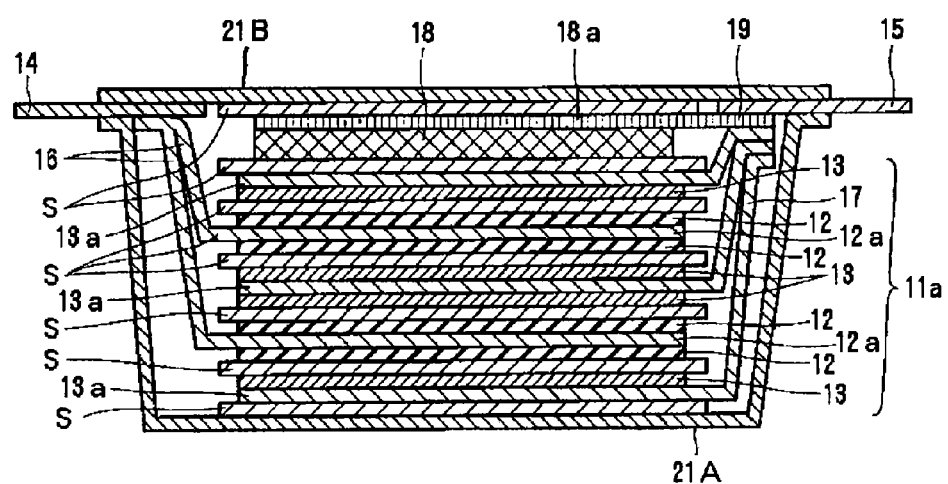
FIG. 4 is a view illustrating an example of the configuration of an electric storage device element.

As illustrated in FIG. 4, the electric storage device element 11 included in the laminate-packaged electric storage device 10 includes an electrode stack 11a that is formed by alternately stacking a plurality of positive plates and a plurality of negative plates via separators S, the plurality of positive plates being formed by forming a positive electrode layer 12 on a positive electrode current collector 12a, and the plurality of negative plates being formed by forming a negative electrode layer 13 on a negative electrode current collector 13a. A lithium metal (lithium electrode layer) 18 (i.e., lithium ion source) is disposed on the upper side of the electrode stack 11a, and a lithium electrode current collector 18a is stacked on the lithium metal 18. Note that reference numeral 19 indicates a lithium electrode connection member.

Each of the plurality of positive plates is electrically connected to a positive electrode power supply tab 14 (i.e., common positive electrode lead member) that is made of aluminum or the like via a connection member 16. Each of the plurality of negative plates is electrically connected to a negative electrode power supply tab 15 (i.e., common negative electrode lead member) that is made of copper or the like via a connection member 17.

The positive electrode power supply tab 14 and the negative electrode power supply tab 15 are provided to outwardly protrude respectively from one end and the other end of the outer package 20.

The positive electrode layer 12 included in the electric storage device element 11 is produced by forming an electrode material optionally together with a conductive material (e.g., activated carbon or carbon black), a binder, and the like. The electrode material for forming the positive electrode layer 12 is not particularly limited as long as the electrode material can reversibly support lithium. Examples of the electrode material for forming the positive electrode layer 12 include positive electrode active materials such as a metal oxide shown by $Li_xM_yO_z$ (wherein M represents a metal atom, and x, y and z are integers) (e.g., $LiCoO_2$, $LiNiO_2$, and $LiFeO_2$), activated carbon, and the like.

The negative electrode layer 13 included in the electric storage device element 11 may be produced by forming an electrode material together with a binder. The electrode material for forming the negative electrode layer 13 is not particularly limited as long as the electrode material can reversibly support lithium. Examples of the electrode material for forming the negative electrode layer 13 include powdery and particulate negative electrode active materials (e.g., graphite, carbon materials, polyacene materials, tin oxide, and silicon acid compounds), and the like.

It is preferable to use a solution prepared by dissolving an electrolyte in an appropriate organic solvent as the electrolyte solution. Specific examples of the organic solvent include aprotic organic solvents such as ethylene carbonate, propylene carbonate, dimethyl carbonate, diethyl carbonate, acetonitrile, and dimethoxyethane. These organic solvents may be used either alone or in combination. A material that produces lithium ions is used as the electrolyte. Specific examples of the electrolyte include LiI, $LiClO_4$, $LiAsF_4$, $LiBF_4$, $LiPF_6$, and the like.

The laminate-packaged electric storage device 10 may be produced as described below, for example.

Specifically, the electric storage device element 11 is disposed on the lower outer package film 21B at a position corresponding to the receiving section 23. The upper outer package film 21A having the opening 26, on which the non-thermally-bondable sheet 30 is secured via the pressure-sensitive adhesive layer 31 at a position corresponding to the non-bonding section 24, is disposed on the electric storage device element 11. The upper outer package film 21A and the lower outer package film 21B are thermally bonded on three sides.

After injecting the electrolyte solution into the space between the upper outer package film 21A and the lower outer package film 21B, the upper outer package film 21A and the lower outer package film 21B are thermally bonded on the remaining one side to form the outer package 20. The laminate-packaged electric storage device 10 is thus obtained.

When gas has been generated inside the receiving section 23 of the outer package 20 that holds the electric storage device element 11, the gas enters the non-bonding section 24 formed in the outer edge area of the outer package 20, and the receiving section 23 and the non-bonding section 24 are sufficiently expanded corresponding to the amount of the gas. Therefore, stress is applied to the seal section 25 of the safety valve 27. Since the safety valve 27 is formed in the area of the non-bonding section 24 at a position other than the center position (i.e., the seal section 25 of the safety valve 27 is integrally formed with the bonding section 22 so that part of the seal section 25 protrudes into the non-bonding section 24 from the bonding section 22 on the side of the non-bonding section 24 that is perpendicular to the side that communicates with the receiving section 23), stress is concentrated on a specific area of the seal section 25 of the safety valve 27, and the specific area of the seal section 25 is preferentially removed as compared with the remaining area of the seal section 25 and the bonding section 22. Since the safety valve 27 is configured so that the opening 26 that is formed through the upper outer package film 21A is surrounded by the seal section 25, the gas is discharged from the outer package to the outside through the opening 26 upon removal of the seal section 25.

According to the laminate-packaged electric storage device 10, when gas has been generated inside the outer package 20, and the outer package 20 has been expanded due to the gas, a large stress is applied to the specific area of the seal section 25 of the safety valve 27, and the specific area of the seal section is necessarily removed. This makes it possible to reliably discharge the gas to the outside through the opening 26 without causing leakage of the electrolyte solution.

Since the seal section 25 is not easily removed when the pressure inside the outer package 20 is low, the outer package 20 exhibits high seal-tightness.

When the opening 26 has an n-gonal shape (n≥3), and the bonding width between the edge of a circle circumscribed to the n-gonal shape and the edge of the seal section 25 is 0.2 to 2.0 mm, stress is concentrated on the specific area of the seal section 25 when the outer package 20 is expanded. Therefore, the seal section 25 is reliably removed when the pressure inside the outer package 20 has reached a given pressure, even if the outer package 20 is expanded rapidly. It is thus possible to obtain a high response to rapid expansion of the outer package 20.

Since the non-thermally-bondable sheet 30 is provided between the non-bonding section 24 of the upper outer package film 21A and the non-bonding section 24 of the lower outer package film 21B, it is possible to prevent a situation in which the non-bonding section 24 of the upper outer package film 21A and the non-bonding section 24 of the lower outer package film 21B are bonded, or part of the upper outer package film 21A and part of the lower outer package film 21B are dissolved in the electrolyte solution and bonded in a heating or high-temperature environment. This makes it possible to ensure that the laminate-packaged electric storage device 10 exhibits operation reliability. Moreover, since the non-thermally-bondable sheet 30 is secured on the upper outer package film 21A using the pressure-sensitive adhesive layer 31, it is possible to easily position the non-bonding section 24 and the opening 26, so that the shape/dimensional accuracy of the non-bonding section 24 and the opening 26 is improved. This makes it possible to reduce a variation in internal pressure at which gas is discharged.

The laminate-packaged electric storage device according to one embodiment of the invention that has the above configuration may be applied to an organic electrolyte capacitor (e.g., lithium-ion capacitor) and an organic electrolyte battery. Since an organic electrolyte capacitor has a charging capacity smaller than that of an organic electrolyte battery, but can be instantaneously charged and discharged (i.e., a change in gas pressure may increase) as compared with an organic electrolyte battery, the laminate-packaged electric storage device may be effectively applied to an organic electrolyte capacitor.

Figure 5:
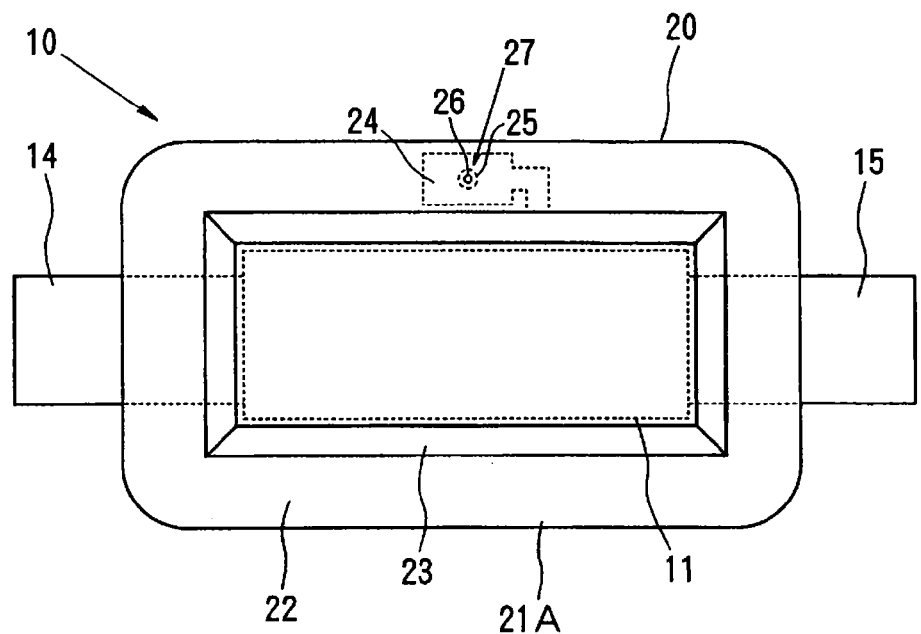
FIG. 5 is a plan view illustrating the configuration of a laminate-packaged electric storage device according to another embodiment of the invention.
Figure 6:
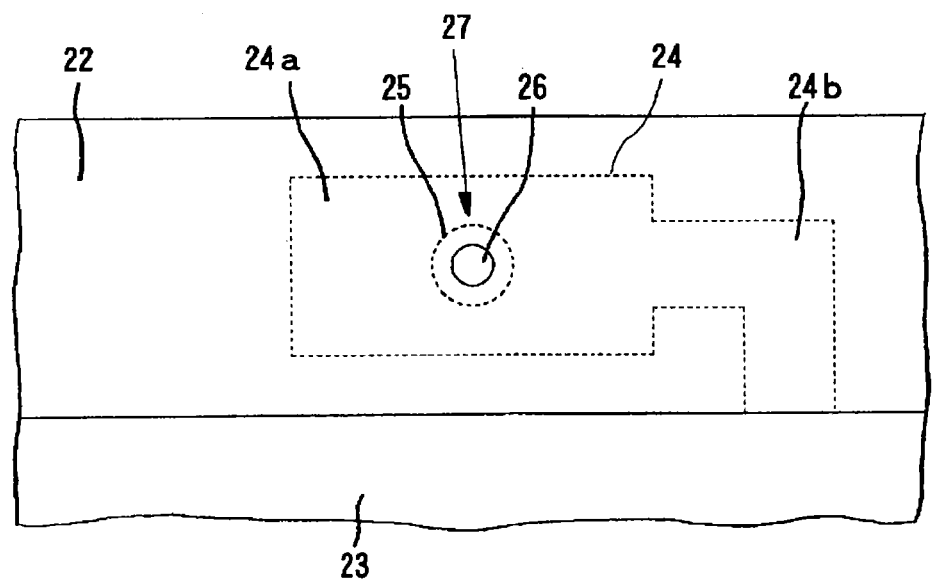
FIG. 6 is a view illustrating a safety mechanism of the laminate-packaged electric storage device illustrated in FIG. 5.
Figure 7:
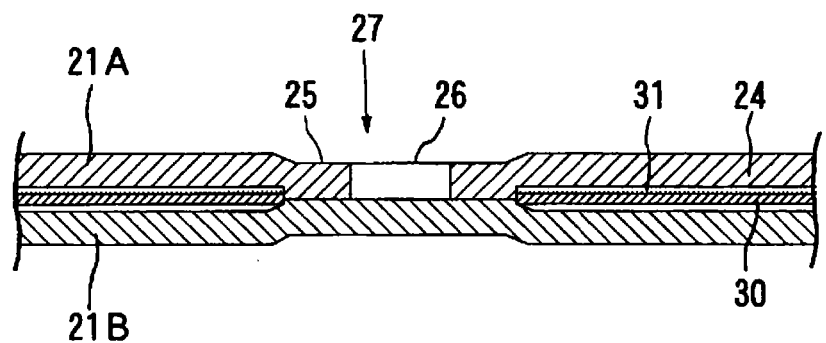
FIG. 7 is a cross-sectional view illustrating the safety mechanism illustrated in FIG. 6.

FIG. 5 is a plan view illustrating the configuration of a laminate-packaged electric storage device according to another embodiment of the invention, FIG. 6 is a view illustrating a safety mechanism of the laminate-packaged electric storage device illustrated in FIG. 5, and FIG. 7 is a cross-sectional view illustrating the safety mechanism illustrated in FIG. 6.

A laminate-packaged electric storage device 10 illustrated in FIG. 5 has a configuration in which a non-bonding section 24 is formed in an outer edge area of an upper outer package film 21A and a lower outer package film 21B of an outer package 20, the non-bonding section 24 including a functional section 24a that is surrounded by a bonding section 22 and has an approximately rectangular planar shape, and a link section 24b that links the functional section 24a and a receiving section 23. A safety valve 27 is formed in the area of the functional section 24a of the non-bonding section 24 at a position other than the center position, the safety valve 27 including a circular opening 26 that is formed through the upper outer package film 21A, and a circular seal section 25 that is formed to surround the opening 26, part of the upper outer package film 21A and part of the lower outer package film 21B being bonded in the seal section 25. In the example illustrated in the drawings, the safety valve 27 is formed at the center position of the area of the functional section 24a of the non-bonding section 24.

A non-thermally-bondable sheet 30 that has a planar shape similar to that of the non-bonding section 24 is provided between the non-bonding section 24 of the upper outer package film 21A and the non-bonding section 24 of the lower outer package film 21B. The non-thermally-bondable sheet 30 is secured on the upper outer package film 21A via a pressure-sensitive adhesive layer 31, for example.

The dimensions of the functional section 24a of the non-bonding section 24 are determined depending on the dimensions of the bonding section 22 and the receiving section 23. For example, the dimension of one side of the functional section 24a that is parallel to one side of the receiving section 23 is 5 to 40 mm, and the dimension on each side of the functional section 24a that is perpendicular to the one side (i.e., each side that extends in the vertical direction in FIG. 1) is 3 to 12 mm.

The width of the link section 24b of the non-bonding section 24 is 3 to 30 mm, for example. The length of the link section 24b is appropriately set depending on the dimensions of the bonding section 22 and the receiving section 23.

The laminate-packaged electric storage device 10 illustrated in FIG. 5 is basically configured in the same manner as the laminate-packaged electric storage device 10 illustrated in FIG. 1 except for the above features.

When gas has been generated inside the receiving section 23 of the outer package 20 that holds the electric storage device element 11, the gas enters the non-bonding section 24 formed in the outer edge area of the outer package 20, and the receiving section 23 and the non-bonding section 24 are sufficiently expanded corresponding to the amount of the gas. Therefore, stress is applied to the seal section 25 of the safety valve 27. Since the safety valve 27 is formed in the area of the non-bonding section 24 at a position other than the center position (i.e., the safety valve 27 is formed in the functional section 24a of the non-bonding section 24), stress is concentrated on a specific area of the seal section 25 of the safety valve 27, and the specific area of the seal section 25 is preferentially removed as compared with the remaining area of the seal section 25 and the bonding section 22. Since the safety valve 27 is configured so that the opening 26 that is formed through the upper outer package film 21A is surrounded by the seal section 25, the gas is discharged from the outer package to the outside through the opening 26 upon removal of the seal section 25.

According to the above laminate-packaged electric storage device 10, when gas has been generated inside the outer package 20, and the outer package 20 has been expanded due to the gas, a large stress is applied to the specific area of the seal section 25 of the safety valve 27, and the specific area of the seal section is necessarily removed. This makes it possible to reliably discharge the gas to the outside through the opening 26 without causing leakage of the electrolyte solution. Since the seal section 25 is not easily removed when the pressure inside the outer package 20 is low, the outer package 20 exhibits high seal-tightness.

Since the non-bonding section 24 includes the functional section 24a in which the safety valve 27 is formed, and the link section 24b that links the functional section 24a and the receiving section 23, it is possible to prevent a situation in which the pressure inside the receiving section 23 decreases rapidly when the seal section 25 of the safety valve 27 is removed. This makes it possible to reliably prevent leakage of the electrolyte solution.

The link section 24b of the non-bonding section 24 is bent so that the receiving section 23 and the safety valve 27 are connected via a sufficiently long path. This makes it possible to more reliably prevent leakage of the electrolyte solution.

Since the non-thermally-bondable sheet 30 is provided between the non-bonding section 24 of the upper outer package film 21A and the non-bonding section 24 of the lower outer package film 21B, it is possible to prevent a situation in which the non-bonding section 24 of the upper outer package film 21A and the non-bonding section 24 of the lower outer package film 21B are bonded, or part of the upper outer package film 21A and part of the lower outer package film 21B are dissolved in the electrolyte solution and bonded in a heating or high-temperature environment. This makes it possible to ensure that the laminate-packaged electric storage device 10 exhibits operation reliability. Moreover, since the non-thermally-bondable sheet 30 is secured on the upper outer package film 21A using the pressure-sensitive adhesive layer 31, it is possible to easily position the non-bonding section 24 and the opening 26, so that the shape/dimensional accuracy of the non-bonding section 24 and the opening 26 is improved. This makes it possible to reduce a variation in internal pressure at which gas is discharged.

The laminate-packaged electric storage devices according to several embodiments of the invention have been described above. Note that the invention is not limited to the above embodiments. Various modifications and variations are possible without departing from the scope of the invention.

Figure 8:
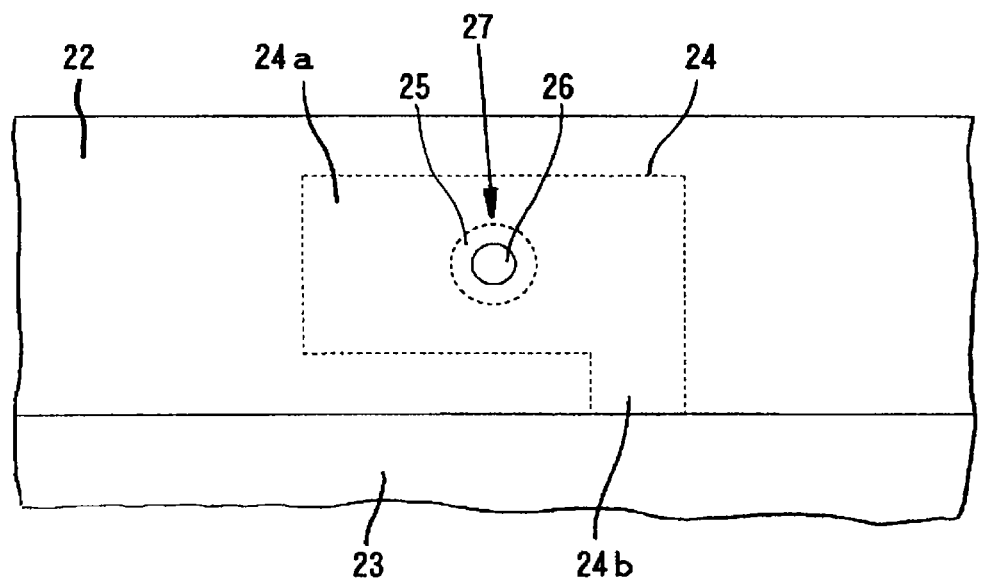
FIG. 8 is a view illustrating a modification of a safety mechanism of a laminate-packaged electric storage device according to one embodiment of the invention.
Figure 9:
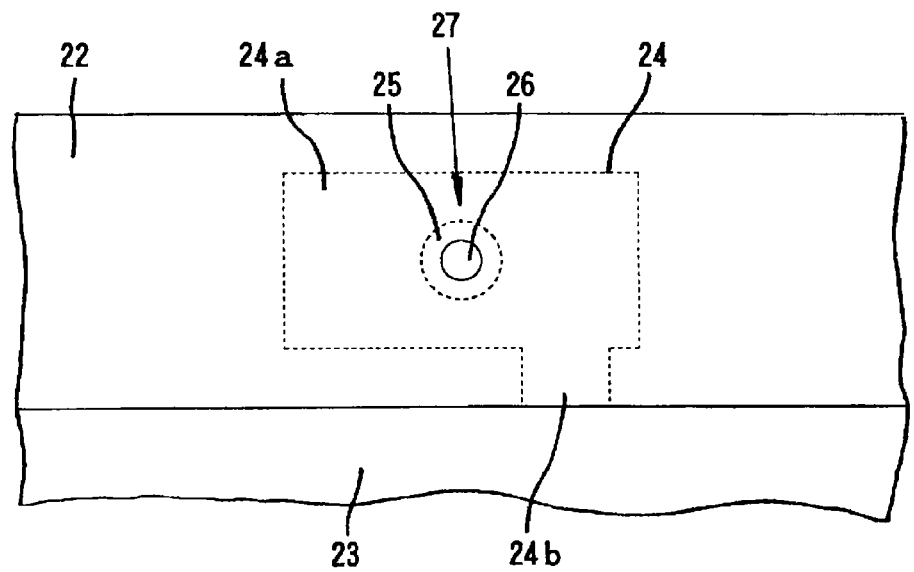
FIG. 9 is a view illustrating another modification of a safety mechanism of a laminate-packaged electric storage device according to one embodiment of the invention.

For example, when the non-bonding section 24 includes the functional section 24a and the link section 24b, the link section 24b need not necessarily be bent, but may be linear (see FIGS. 8 and 9), and the position of the link section 24b may be appropriately selected.

Figure 10:
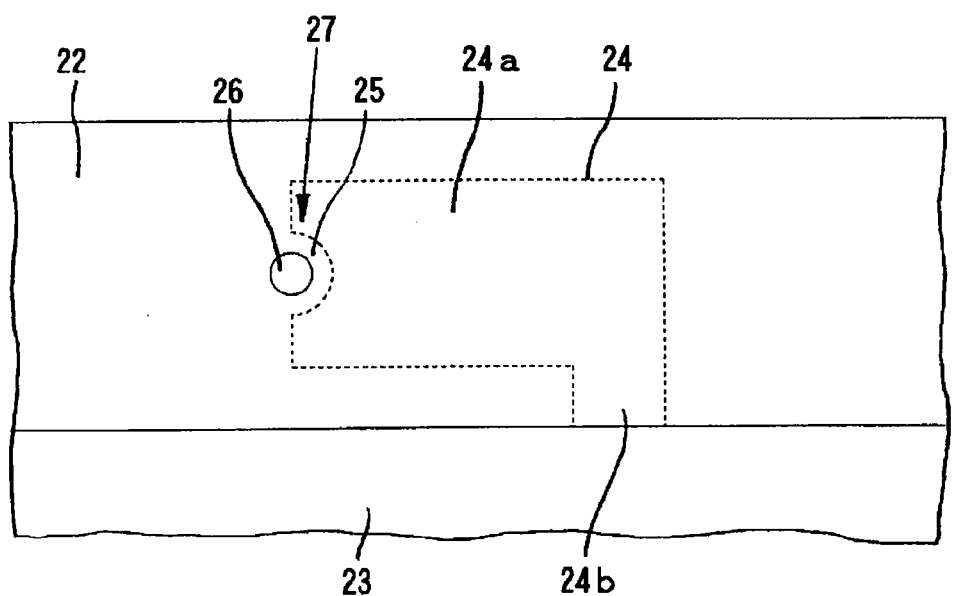
FIG. 10 is a view illustrating still another modification of a safety mechanism of a laminate-packaged electric storage device according to one embodiment of the invention.

When the non-bonding section 24 includes the functional section 24a and the link section 24b, the seal section 25 of the safety valve 27 may be integrally formed with the bonding section 22 so that part of the seal section 25 protrudes into the non-bonding section 24 from the bonding section 22 (see FIG. 10).

Figure 11:
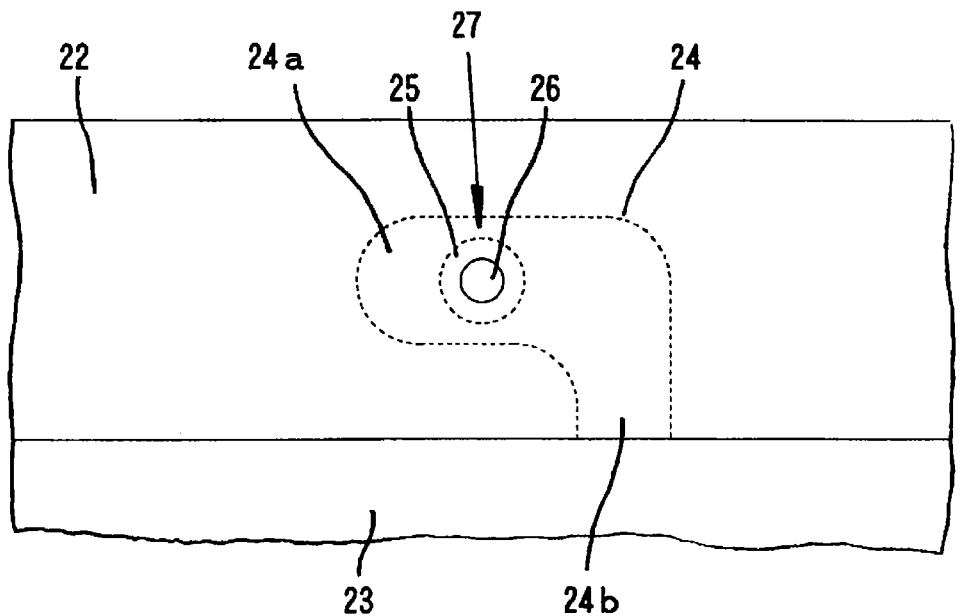
FIG. 11 is a view illustrating a yet another modification of a safety mechanism of a laminate-packaged electric storage device according to one embodiment of the invention.

The functional section 24a need not necessarily have an approximately rectangular planar shape. The planar shape of the functional section 24a may be appropriately selected. For example, the functional section 24a may have a curved shape (see FIG. 11).

The opening may be formed through only the lower outer package film, or may be formed through the upper outer package film and the lower outer package film.

The shape of the seal section and the opening of the safety valve is not limited to a circle and an n-gon. The seal section and the opening may have an another arbitrary shape (e.g., elliptical shape).

The non-thermally-bondable sheet may be secured on the lower outer package film.

The non-thermally-bondable sheet is not an essential element of the invention. When the non-thermally-bondable sheet is not provided, however, the non-bonding section of the upper outer package film and the non-bonding section of the lower outer package film may be bonded, or part of the upper outer package film and part of the lower outer package film may be dissolved in the electrolyte solution and bonded in a heating or high-temperature environment, so that the safety valve may not function properly. Therefore, it is preferable to provide the non-thermally-bondable sheet.

When producing the laminate-packaged electric storage device without using the non-thermally-bondable sheet, the upper outer package film and the lower outer package film may be stacked in a state in which a heat block is provided between the upper outer package film and the lower outer package film in an area corresponding to non-bonding section, and thermally bonded on three sides to form a non-bonding section. The heat block may then be removed.

EXAMPLES

Example 1

(1) Production of Positive Plate

A plurality of circular through-holes having an open area of 0.79 mm$^2$ were punched in a strip-shaped aluminum foil (width: 200 mm, thickness: 15 micrometers) in a staggered arrangement to obtain a current collector precursor having an open frontal area of 42%. A conductive coating material was applied to part of each side of the current collector precursor using a vertical-die double-sided coater (coating width: 130 mm, coating speed: 8 m/min) so that the total coating thickness was 20 micrometers, and dried at 200° C. for 24 hours under reduced pressure to form a conductive layer on each side of the current collector precursor.

A positive electrode coating material was applied to the conductive layer formed on each side of the current collector precursor using a vertical-die double-sided coater (coating speed: 8 m/min) so that the total coating thickness was 150 micrometers, and dried at 200° C. for 24 hours under reduced pressure to form a positive electrode layer on the conductive layer.

The resulting material in which the conductive layer and the positive electrode layer were stacked on part of the current collector precursor was cut to a size of 98 mm×143 mm so that an area in which the conductive layer and the positive electrode layer were stacked (hereinafter may be referred to as "coated area") had a size of 98 mm×128 mm, and an area in which the conductive layer and the positive electrode layer were not formed (hereinafter may be referred to as "uncoated area") had a size of 98 mm×15 mm. A positive plate was thus obtained.

(2) Production of Negative Plate

A plurality of circular through-holes having an open area of 0.79 mm$^2$ were punched in a strip-shaped copper foil (width: 200 mm, thickness: 15 micrometers) in a staggered arrangement to obtain a current collector precursor having an open frontal area of 42%. A negative electrode coating material was applied to part of each side of the current collector precursor using a vertical-die double-sided coater (coating width: 130 mm, coating speed: 8 m/min) so that the total coating thickness was 80 micrometers, and dried at 200° C. for 24 hours under reduced pressure to form a negative electrode layer on each side of the current collector precursor.

The resulting material in which the negative electrode layer was formed on part of the current collector precursor was cut to a size of 100 mm×143 mm so that an area in which the negative electrode layer was formed (hereinafter may be referred to as "coated area") had a size of 100 mm×128 mm, and an area in which the negative electrode layer was not formed (hereinafter may be referred to as "uncoated area") had a size of 100 mm×15 mm. A negative plate was thus obtained.

(3) Production of Lithium-Ion Capacitor Element

Ten positive plates, eleven negative plates, and twenty-two separators having a thickness of 50 micrometers were provided. The positive plates and the negative plates were stacked (separator/negative plate/separator/positive plate) so that the coated areas overlapped and the uncoated areas did not overlap, and the four sides of the resulting stack was secured using a tape to obtain an electrode stack unit.

A lithium foil having a thickness of 260 micrometers was cut so that the capacity was 550 mAh/g of the negative electrode active material included in the electrode stack unit, and compression-bonded to a stainless steel mesh having a thickness of 40 micrometers to obtain a lithium ion source member. The lithium ion source member was disposed on the electrode stack unit so that the lithium ion source member was opposite to the negative electrode.

An aluminum positive electrode power supply tab (width: 50 mm, length: 50 mm, thickness: 0.2 mm) in which a sealant film was thermally bonded to the seal section, was ultrasonic-welded to the uncoated area of each positive plate of the electrode stack unit. A copper negative electrode power supply tab (width: 50 mm, length: 50 mm, thickness: 0.2 mm) in which a sealant film was thermally bonded to the seal section, was resistance-welded to the uncoated area of each negative plate and the lithium ion source member of the electrode stack unit. A lithium-ion capacitor element was thus obtained.

(4) Production of Laminate-Packaged Lithium-Ion Capacitor

An upper outer package film (longitudinal dimension: 125 mm, lateral dimension: 160 mm, thickness: 0.15 mm) (width of outer edge area (bonding section: 10 mm)) in which a PP layer, an aluminum layer, and a nylon layer were stacked, and the center area was drawn (longitudinal dimension: 105 mm, lateral dimension: 140 mm), and a lower outer package film (longitudinal dimension: 125 mm, lateral dimension: 160 mm, thickness: 0.15 mm) in which a PP layer, an aluminum layer, and a nylon layer were stacked, were provided. An opening having a diameter d of 2 mm was formed in the outer edge area of the upper outer package film. A non-thermally-bondable sheet (longitudinal dimension: 6 mm, lateral dimension: 140 mm, thickness: 0.02 mm) that was made of a polyimide, had a semicircular cut (diameter: 3.5 mm) at the center of one side in the longitudinal direction, and was provided with a pressure-sensitive adhesive layer on one side, was provided.

The non-thermally-bondable sheet was secured on the outer edge area of the upper outer package film at the center position along one side (i.e., a position corresponding to the non-bonding section) via the pressure-sensitive adhesive layer, and a test gas inlet having a diameter of 1 mm was formed at the center position along the opposite side.

The lithium-ion capacitor element was disposed on the lower outer package film at a position corresponding to the receiving section so that the positive electrode power supply tab and the negative electrode power supply tab outwardly protruded from the ends of the lower outer package film. The upper outer package film was disposed on the lithium-ion capacitor element, and three sides (i.e., two sides from which the positive electrode power supply tab and the negative electrode power supply tab respectively protruded, and one side on which the non-thermally-bondable sheet was disposed) of the outer edge area of the upper outer package film and the outer edge area of the lower outer package film were thermally bonded to form a bonding section (that surrounds the receiving section) on the three sides, and form a non-bonding section (that communicates with the receiving section) and a safety valve on the side on which the non-thermally-bondable sheet was disposed.

The side of the outer edge area of the upper outer package film and the side of the outer edge area of the lower outer package film that were not thermally bonded were secured (sandwiched) using a stainless steel sheet in which a tubular gas inlet was formed and another stainless steel sheet. The stainless steel sheet was disposed so that the gas inlet overlapped the gas inlet formed in the upper outer package film.

A laminate-packaged lithium-ion capacitor was thus obtained (three laminate-packaged lithium-ion capacitors were obtained in total).

(5) Test

Each laminate-packaged lithium-ion capacitor was disposed between two acrylic plates that were disposed at an interval of 10 mm. Nitrogen gas was injected into the laminate-packaged lithium-ion capacitor through the gas inlet formed in the stainless steel sheet to measure the internal pressure at which the injected nitrogen gas was discharged to the outside, and determine an area of the upper outer package film and the lower outer package film where the nitrogen gas was discharged.

It was confirmed that the seal section of the safety valve of each laminate-packaged lithium-ion capacitor was removed, and the nitrogen gas was discharged through the safety valve. The internal pressure at which the nitrogen gas was discharged was 0.8 MPa on average.

It was confirmed that a specific area of the seal section positioned near the receiving section was removed in each laminate-packaged lithium-ion capacitor.

Example 2

Figure 12:
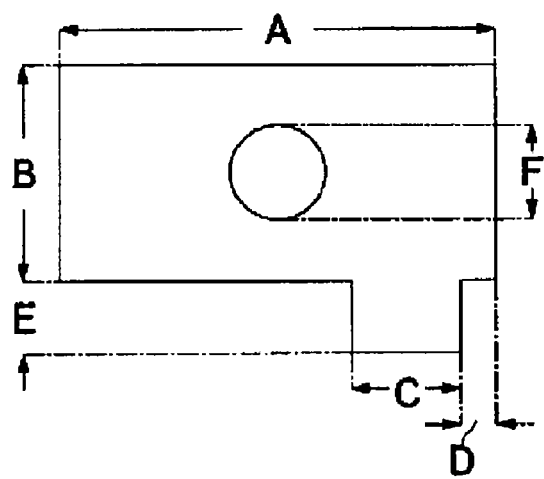
FIG. 12 is an enlarged plan view illustrating a non-thermally-bondable sheet used in Example 2.

A laminate-packaged lithium-ion capacitor was produced (three laminate-packaged lithium-ion capacitors were produced in total), and tested in the same manner as in Example 1, except for using a non-thermally-bondable sheet having the planar shape illustrated in FIG. 12 (A=30 mm, B=6 mm, C=10 mm, D=2 mm, E×2 mm, F=3.5 mm).

It was confirmed that the seal section of the safety valve of each laminate-packaged lithium-ion capacitor was removed, and the nitrogen gas was discharged through the safety valve. The internal pressure at which the nitrogen gas was discharged was 0.8 MPa on average.

It was confirmed that a specific area of the seal section positioned near the receiving section was removed in each laminate-packaged lithium-ion capacitor.

Example 3

Figure 13A:
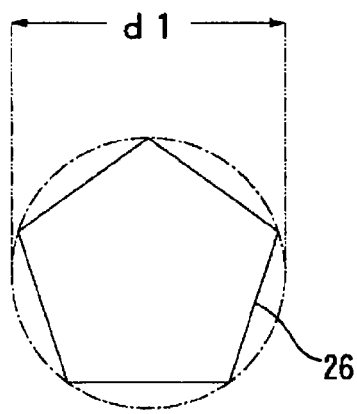
FIG. 13A is a view illustrating the shape of an opening formed in an upper outer package film in Example 3.

A laminate-packaged lithium-ion capacitor was produced (three laminate-packaged lithium-ion capacitors were produced in total), and tested in the same manner as in Example 1, except for forming an opening (26) (see FIG. 13A) having a regular pentagonal shape (diameter d1 of circumscribed circle: 2 mm) in the upper outer package film, and using a non-thermally-bondable sheet having the planar shape illustrated in FIG. 12 (A=30 mm, B=6 mm, C=10 mm, D=2 mm, E=2 mm, F=2.9 mm).

It was confirmed that the seal section of the safety valve of each laminate-packaged lithium-ion capacitor was removed, and the nitrogen gas was discharged through the safety valve. The internal pressure at which the nitrogen gas was discharged was 0.8 MPa on average.

It was confirmed that a specific area of the seal section positioned near the receiving section was removed in each laminate-packaged lithium-ion capacitor.

Example 4

Figure 13B:
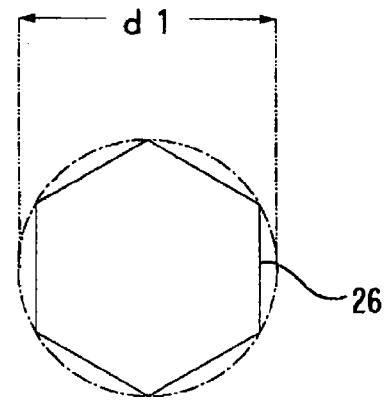
FIG. 13B is a view illustrating the shape of an opening formed in an upper outer package film in Example 4.

A laminate-packaged lithium-ion capacitor was produced (three laminate-packaged lithium-ion capacitors were produced in total), and tested in the same manner as in Example 1, except for forming an opening (26) (see FIG. 13B) having a regular hexagonal shape (diameter d1 of circumscribed circle: 2 mm) in the upper outer package film, and using a non-thermally-bondable sheet having the planar shape illustrated in FIG. 12 (A=30 mm, B=6 mm, C=10 mm, D=2 mm, E=2 mm, F=2.9 mm).

It was confirmed that the seal section of the safety valve of each laminate-packaged lithium-ion capacitor was removed, and the nitrogen gas was discharged through the safety valve. The internal pressure at which the nitrogen gas was discharged was 0.8 MPa on average.

It was confirmed that a specific area of the seal section positioned near the receiving section was removed in each laminate-packaged lithium-ion capacitor.

Comparative Example 1

Figure 14:
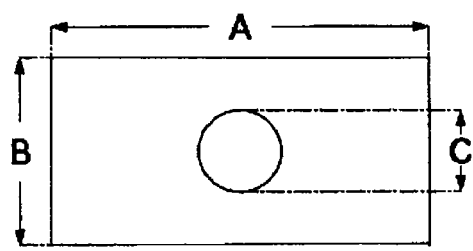
FIG. 14 is an enlarged plan view illustrating a non-thermally-bondable sheet used in Comparative Example 1.
Figure 15:
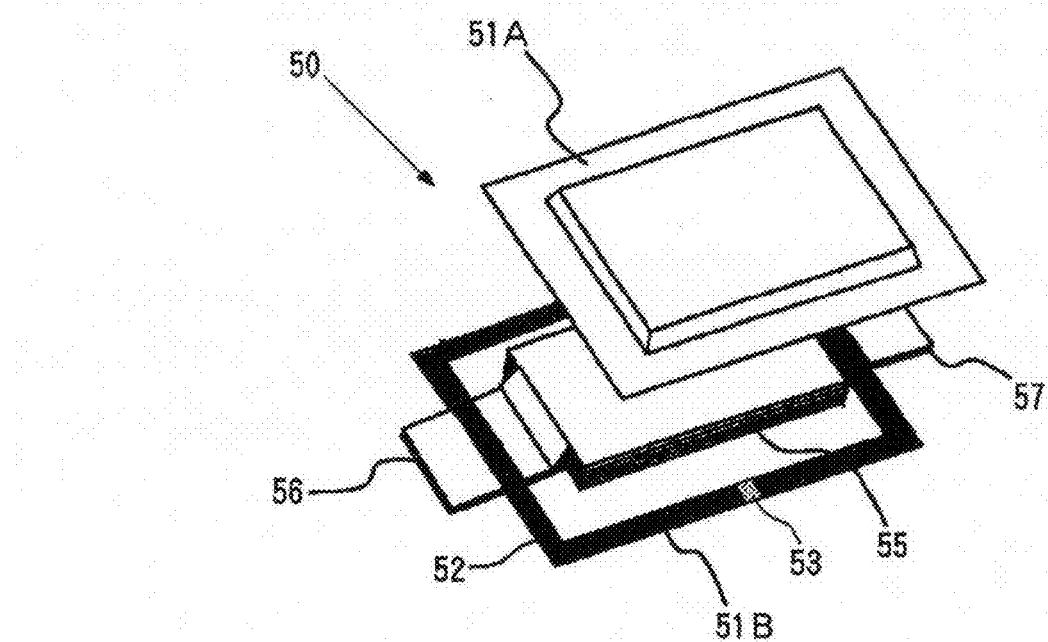
FIG. 15 is an exploded view illustrating the configuration of a laminate-packaged electric storage device that is provided with a related-art safety mechanism.

A laminate-packaged lithium-ion capacitor was produced (three laminate-packaged lithium-ion capacitors were produced in total), and tested in the same manner as in Example 1, except for using a non-thermally-bondable sheet having the planar shape illustrated in FIG. 14 (A=30 mm, B=7 mm, C=3.5 mm).

It was confirmed that the seal section of the safety valve of each laminate-packaged lithium-ion capacitor was removed, and the nitrogen gas was discharged through the safety valve. The internal pressure at which the nitrogen gas was discharged was 0.4 MPa on average.

It was confirmed that the laminate-packaged lithium-ion capacitors differed in the position of the area in which the seal section was removed.

The test results for the laminate-packaged lithium-ion capacitors of Examples 1 to 4 and Comparative Example 1 are shown in Table 1. In Table 1, the internal pressure at which the nitrogen gas was discharged indicates the average value of the three laminate-packaged lithium-ion capacitors.

TABLE 1

| | Diameter (mm) of outer edge of seal section | Diameter (mm) of opening | Bonding width (mm) of seal section | Internal pressure (MPa) at which gas was discharged |
|---|---|---|---|---|
| Example 1 | 3.5 | 2 | 0.75 | 0.8 |
| Example 2 | 3.5 | 2 | 0.75 | 0.8 |
| Example 3 | 2.9 | 2 | 0.45 | 0.8 |
| Example 4 | 2.9 | 2 | 0.45 | 0.8 |
| Comparative Example 1 | 3.5 | 2 | 0.75 | 0.4 |

As is clear from the above results, a specific area of the seal section of the safety valve was removed when the pressure inside the outer package reached 0.8 MPa, and the nitrogen gas was discharged through the safety valve when using the laminate-packaged lithium-ion capacitors of Examples 1 to 4. The seal section of the safety valve was also removed when using the laminate-packaged lithium-ion capacitors of Comparative Example 1. However, the seal section was removed when the pressure inside the outer package reached 0.4 MPa which is considerably lower than that of Examples 1 to 4, and the laminate-packaged lithium-ion capacitors of Comparative Example 1 differed in the position of the area in which the seal section was removed.

Note that it is preferable that the opening formed in the upper outer package film have an n-gonal shape wherein n is equal to or larger than 3, and more preferably an n-gonal shape wherein n is 5 to 8 (see Examples 3 and 4). When the opening has such a shape, it is preferable that the bonding width between the edge of a circle circumscribed to the n-gonal shape and the edge of the seal section be 0.2 to 2.0 mm, and more preferably 0.3 to 1.2 mm.

When the opening has a polygonal shape in which the distance from the center point to the edge of the opening varies, stress is easily applied to the corners of the opening as compared the case where the opening has a shape in which the distance from the center point to the edge of the opening is uniform, so that the seal section is reliably removed when the pressure inside the outer package has reached a given value.

A variation in internal pressure at which gas is discharged to the outside can be reduced by setting the bonding width of the seal section to 0.2 to 2 mm.

| REFERENCE SIGNS LIST | |
|---|---|
| 10 | Laminate-packaged electric storage device |
| 11 | Electric storage device element |
| 11a | Electrode stack |
| 12 | Positive electrode layer |
| 12a | Positive electrode current collector |
| 13 | Negative electrode layer |
| 13a | Negative electrode current collector |
| 14 | Positive electrode power supply tab |
| 15 | Negative electrode power supply tab |
| 16, 17 | Connection member |
| 18 | Lithium metal (lithium electrode layer) |
| 18a | Lithium electrode current collector |
| 19 | Lithium electrode connection member |
| 20 | Outer package |
| 21A | Upper outer package film |
| 21B | Lower outer package film |
| 22 | Bonding section |
| 22a | Narrow area |
| 23 | Receiving section |
| 24 | Non-bonding section |
| 24a | Functional section |
| 24b | Link section |
| 25 | Seal section |
| 26 | Opening |
| 27 | Safety valve |
| 30 | Non-thermally-bondable sheet |
| 31 | Pressure-sensitive adhesive layer |
| 50 | Laminate-packaged electric storage device |
| 51A | Upper outer package film |
| 51B | Lower outer package film |
| 52 | Bonding section |
| 53 | Weakly bonded area |
| 55 | Electric storage device element |
| 56 | Positive electrode power supply tab |
| 57 | Negative electrode power supply tab |
| S | Separator |

The invention claimed is:

1. A laminate-packaged electric storage device comprising:

an outer package, an electric storage device element, and an electrolyte solution, the outer package being formed by stacking and seal-tight bonding outer package films along a bonding section that is formed in an outer edge area of each of the outer package films, the electric storage device element and the electrolyte solution being held in a receiving section that is formed inside the outer package, and a positive electrode power supply tab and a negative electrode power supply tab being electrically connected to the electric storage device element and outwardly protruding, a non-bonding section that is surrounded by the bonding section and communicates with the receiving section being formed in the outer edge area of each of the outer package films, an opening that is formed through at least one of the outer package films, and a seal section that is formed to surround the opening being formed in an area of the non-bonding section, the outer package films being bonded in the seal section, the opening being formed in the area of the non-bonding section at a position other than a center position, and the receiving section having in a planar view:
- a first side intersecting the positive electrode power supply tab;
- a second side intersecting the negative electrode power supply tab; and
- a third side that is connected to the first and second sides at both ends, part of the third side being one side of the non-bonding section and communicating with the receiving section.

2. The laminate-packaged electric storage device according to claim 1,
wherein the non-bonding section has an approximately rectangular planar shape, and has one side that communicates with the receiving section, and the seal section is integrally formed with the bonding section so that part of the seal section protrudes into the non-bonding section from the bonding section on another side of the non-bonding section that is perpendicular to the one side that communicates with the receiving section.

3. The laminate-packaged electric storage device according to claim 1,
wherein the non-bonding section includes a functional section that is surrounded by the bonding section, and has the opening formed therein, and a link section that links the functional section and the receiving section.

4. The laminate-packaged electric storage device according to claim 3,
wherein the link section of the non-bonding section is bent.

5. The laminate-packaged electric storage device according to claim 3,
wherein the seal section is integrally formed with the bonding section so that part of the seal section protrudes into the non-bonding section from the bonding section.

6. The laminate-packaged electric storage device according to claim 1,
wherein the opening has an n-gonal shape ($n \geq 3$), and a bonding width between an edge of a circle circumscribed around the n-gonal shape and an edge of the seal section is 0.2 to 2.0 mm.

7. The laminate-packaged electric storage device according to claim 1,
wherein a non-thermally-bondable sheet that is formed of a polyimide, polyphenylene sulfide, or cellulose is provided between the non-bonding sections of the outer package films.

8. The laminate-packaged electric storage device according to claim 7,
wherein the non-thermally-bondable sheet is secured on at least one of the outer package films via a pressure-sensitive adhesive layer.

9. The laminate-packaged electric storage device according to claim 1,
wherein the non-bonding section has one side that communicates with the receiving section, the one side extends in a first direction and has a first dimension, the outer package films have a second dimension in the first direction, and a ratio of the first dimension to the second dimension is $1/60$ to $2/3$.

10. The laminate-packaged electric storage device according to claim 9, wherein the first dimension is 5 to 40 mm; and the second dimension is 60 to 300 mm.

* * * * *